United States Patent Office 2,696,503
Patented Dec. 7, 1954

2,696,503

PREPARATION OF BENZOYL FLUORIDE FROM MONOCHLORO- OR MONOBROMOBENZENE AND SODIUM FLUORIDE

William W. Prichard, Wilmington, Del., assignor to E. I. du Pont de Nemours and Company, Wilmington, Del., a corporation of Delaware No Drawing. Application May 29, 1951, Serial No. 228,985

2 Claims. (Cl. 260—544)

This invention relates to the preparation of aromatic acyl fluorides.

Aromatic acyl fluorides, i. e., aroyl fluorides, are valuable chemical intermediates. In some instances they are capable of reactions of which the corresponding aroyl chlorides are incapable, e. g., aroyl fluorides can react with aromatic nuclei to give ketones in the absence of Friedel-Crafts catalysts, whereas aroyl chlorides require the presence of such catalysts. Moreover, the aroyl fluorides are in general much more stable and resistant to hydrolysis than the chlorides; for example, benzoyl fluoride can be steam distilled.

Heretofore, aromatic acyl fluorides have in general been prepared by indirect, complicated methods. As an illustration, benzoyl fluoride has been prepared by first making benzoyl chloride and then reacting it with potassium hydrogen fluoride. Linville U. S. Patent 2,517,898 discloses a process of preparing benzoyl fluoride from benzenediazonium fluoborate, a step in the direction of a more direct and practical method of preparation. Nevertheless, it is fully apparent that there is still a need for a direct and practical method of preparing aromatic acyl fluorides from more readily available materials.

An object of the present invention is to provide a new and improved process for preparing aromatic acyl fluorides. A further object is to provide a more direct and practical method of preparing such fluorides. A particular object is to provide a direct method of preparing these fluorides in one step from readily available materials. Other objects will be apparent from the description of the invention given hereinafter.

The above objects are accomplished according to the present invention by reacting under substantially anhydrous conditions at a temperature above 275° C. and a pressure above 100 atmospheres an aryl halide in which halogen of atomic number 17 to 53, inclusive, is attached to nuclear carbon of an aromatic ring, with carbon monoxide, nickel carbonyl, and a fluoride of a metal of groups I-A and II-A of the periodic table, whereby the aromatic acyl fluoride corresponding to the aryl halide used is formed.

In a more specific form, the invention comprises preparing an aromatic acyl fluoride by reacting under substantially anhydrous conditions at a temperature of 275° C.–400° C., more preferably, 350° C.–400° C., and a pressure of 100 to 1500 atmospheres, more preferably, 200 to 650 atmospheres, an aryl chloride of one to two aromatic rings in which chlorine is attached to nuclear carbon of an aromatic ring, in an atmosphere of carbon monoxide with at least 0.5 mole of nickel carbonyl per equivalent of C-chlorine group of the aryl chloride and at least one stoichiometric equivalent, per C-chlorine group of the aryl chloride, of a fluoride of a metal of groups I-A and II-A of the periodic table.

It has now been found that aromatic acyl fluorides may be prepared directly and in a one-step reaction from more readily available materials than has been possible heretofore. The reaction mechanism whereby the aroyl fluoride is formed, is not known with certainty. The nickel carbonyl is undoubtedly a catalyst since the reaction does not proceed in its absence, but at the same time there is at least one competing reaction taking place since the nickel carbonyl is gradually converted to nickel fluoride. It is theorized that this may occur through transitory formation of nickel chloride which may react with the metal fluoride present.

It is not essential that the nickel carbonyl be present in the reaction mixture initially since it may be produced in situ by interaction of the carbon monoxide with a nickel salt which acts as a nickel carbonyl precursor. Thus, instead of preformed nickel carbonyl, there can be used such salts as nickel cyanide, nickel chloride, nickel bromide, nickel molybdite, or finely-divided metallic nickel. However, the best results are generally attained by using nickel carbonyl itself as part of the original mixture.

The following examples wherein all proportions are by weight unless otherwise stated, illustrate specific embodiments of the invention.

Example I

A stainless steel-lined pressure vessel was charged with 112 parts of monochlorobenzene, 20 parts of nickel carbonyl, and 42 parts of anhydrous sodium fluoride. The vessel was sealed and pressured with carbon monoxide to a pressure of 100 atmospheres. The temperature inside the reaction vessel was raised to 378° C. during one hour. The pressure in the vessel was then raised to 600 atmospheres by injection of carbon monoxide and the reaction mixture was held at 378° C. for one hour, during which time a pressure drop of 50 atmospheres was noted. The vessel was thereupon cooled, bled to atmospheric pressure, and its contents were discharged. The reaction product consisted of 44 parts of a white solid and 107 parts of a yellow liquid. The liquid was distilled, giving the following fractions:

| Fraction | Boiling Point, ° C. | Pressure, mm. | Amount, parts |
|---|---|---|---|
| 1 | 59–66 | 93 | 0.5 |
| 2 | 66–78 | 84–89 | 80 |
| 3 | 78–90 | 89 | 12.1 |
| Non-volatile residue | | | 1 |

Fraction 3 was pure benzoyl fluoride, identified by its normal boiling point of 155° C. and by the fact that it reacted exothermically with aniline to give benzanilide, melting point 162° C.–163° C. Fraction 2 contained 6.3 parts of additional benzoyl fluoride (identified by conversion to benzanilide) and 73.7 parts of unreacted chlorobenzene. The total conversion of monochlorobenzene to benzoyl fluoride was 14.8%.

Example II

A silver-lined pressure vessel was charged as in Example I, pressured with carbon monoxide to a pressure of 100 atmospheres, and heated to 325° C. for two hours. No additional carbon monoxide pressure was applied. The maximum pressure reached was 200 atmospheres. The reaction product was worked up as in Example I and found to contain 12.6 parts of benzoyl fluoride, representing a 10.2% conversion of chlorobenzene.

The above procedure was repeated except that the vessel was pressured with carbon monoxide to only 60 atmospheres at ordinary temperature and then heated only to 275° C., a maximum pressure of 120 atmospheres being reached. Total conversion to benzoyl fluoride was 4%.

The above procedure was again repeated, the vessel being pressured with carbon monoxide to 100 atmospheres at ordinary temperature, except that heating was carried up to 374° C. for one hour. No additional carbon monoxide pressure was applied and the maximum pressure reached was 240 atmospheres. Total conversion to benzoyl fluoride was 29.8%.

This example illustrates the effect on conversion of the monochlorobenzene to benzoyl fluoride because of different temperature/pressure combinations.

Example III

A silver-lined pressure vessel similar to that of Example II was charged with 73.5 parts of para-dichlorobenzene, 41 parts of sodium fluoride, 20 parts of nickel carbonyl, and 30 parts of benzene. The vessel was sealed and pressured with 100 atmospheres of carbon monoxide. The temperature was raised to 325° C. and the pressure was then raised to 450 atmospheres by injection of carbon monoxide. After two hours at this temperature and pressure, the pressure being maintained by intermittent injection of carbon monoxide, the vessel was cooled, bled to atmospheric pressure and its contents were discharged. The liquid reaction product on distillation gave 6.15 parts of volatile material from which 5 parts of para-chlorobenzoyl fluoride was isolated. This product was identified by its reaction with analine which gave para-chlorobenzanilide melting at 195° C.

*Example IV*

A silver-lined pressure vessel similar to that of Example II was charged with 78.5 parts of bromobenzene, 21 parts of anhydrous sodium fluoride, 20 parts of nickel carbonyl, and 100 parts of benzene. The vessel was closed, pressured to 100 atmospheres with carbon monoxide and heated to 300° C. The pressure was then raised to 500 atmospheres by injection of carbon monoxide and the vessel was held at this temperature and pressure (by intermittent injection of carbon monoxide) for one hour. The reaction product consisted of 192.5 parts of a mixture of liquid and solid materials. This was heated up to 142° C. at atmospheric pressure to remove the benzene, after which the pressure was lowered to 10 mm. and 26 parts of liquid distillate were obtained at 142° C. Refractionation of this product gave 13.8 parts of benzoyl fluoride, corresponding to a 22.4% conversion.

*Example V*

A silver-lined pressure vessel similar to that of Example II was charged with 112 parts of chlorobenzene, 20 parts of nickel carbonyl, and 39 parts of calcium fluoride. The vessel was closed, pressured to 100 atmospheres with carbon monoxide, heated to 325° C. and the pressure was then raised to 450 atmospheres by injection of carbon monoxide. After a two-hour reaction period with the pressure maintained by intermittent injection of carbon monoxide, there was obtained a total of 148.3 parts of reaction product, of which 80 parts was liquid. This liquid was distilled. The major part of it was unreacted chlorobenzene, boiling at 130° C., and there was obtained 3 parts of benzoyl fluoride distilling at 87° C. at 72 mm. pressure.

*Example VI*

A mixture of 75 parts of ortho-dichlorobenzene, 42 parts of anhydrous sodium fluoride, and 20 parts of nickel carbonyl, was reacted with carbon monoxide as described in Example V. The liquid portion of the reaction product was distilled at 88 mm. pressure. After 38 parts of unreacted ortho-dichlorobenzene had been recovered at 58° C.–66° C. at 8 mm. pressure, the boiling point rose to 71° C.–77° C. at 8 mm. pressure and there was obtained 5.8 parts of distillate which solidified to a low melting solid. This was identified as ortho-chlorobenzoyl fluoride by hydrolysis to ortho-chlorobenzoic acid, melting point 141-2° C., and by its reaction with aniline to give ortho-chlorobenzanilide, melting point 117° C.–118° C.

*Example VII*

A mixture of 112 parts of chlorobenzene, 2 parts of nickel cyanide, and 42 parts of sodium fluoride, was reacted with carbon monoxide at 325° C. and 400 atmospheres pressure for one hour as in Example I. There were obtained 141.6 parts of reaction product, most of which was unreacted chlorobenzene, but containing benzoyl fluoride in amount corresponding to a 1.2% conversion. This was identified by its reaction with aniline to give benzanilide.

It will be understood that the above examples are merely illustrative and that the invention broadly comprises reacting under substantially anhydrous conditions at a temperature above 275° C. and a pressure above 100 atmospheres an aryl halide in which halogen of atomic number 17 to 53, inclusive, is attached to nuclear carbon of an aromatic ring, with carbon monoxide, nickel carbonyl, and a fluoride of a metal of groups I–A and II–A of the periodic table to form the aroyl fluoride corresponding to the aryl halide.

The reaction of this invention is applicable, in general, to aryl halides containing chlorine, bromine, or iodine attached directly to the aromatic ring. Such compounds include monochlorobenzene, o-dichlorobenzene, p-dichlorobenzene, alpha- and beta-chloronaphthalenes, 1,8-dichloronaphthalenes, the chloroanthracenes, o-chlorodiphenyl and the like, and the corresponding bromo and iodo compounds. The preferred reactants are the chlorinated hydrocarbons of one to two aromatic rings.

The proportions of reactants can be varied extremely widely in so far as forming the aroyl fluoride is concerned. In the interest of economy and conversion, it is usually desirable to employ at least about 0.5 mole of nickel carbonyl per equivalent of C-halogen group of the aryl halide used. This can be accomplished in a continuous process by continuously replenishing the nickel carbonyl to make up for any losses caused by reaction or by thermal decomposition. In batchwise operation it is preferred to employ initially at least 0.5 mole of nickel carbonyl per equivalent of C-halogen group of the aryl halide. This is not intended to imply that an excess of the aryl halide cannot be present but rather that the number of equivalents of C-halogen group undergoing reaction may be limited by the number of available equivalents of metal carbonyl. Reaction mixtures containing from 0.5 to 2.5 moles of nickel carbonyl per equivalent of C-halogen of the aryl halide give the best results.

While the carbon monoxide combined as nickel carbonyl is actually effective in the reaction, it is far more practical to operate in an atmosphere of additional carbon monoxide from an external source. Normally, the reaction vessel will be pressured with carbon monoxide, thus assuring the presence of carbon monoxide in substantial excess of any that could be used in the reaction.

Likewise, it is desirable to use the metal fluoride in amounts at least stoichiometrically equivalent to the aryl halide, that is, such that there is at least one atom of fluorine present per C-halogen group of the aryl halide. Again, this is not to say that there cannot be used much less metal fluoride relative to the aryl halide, but only that, if this is done, the yield of aroyl fluoride will be decreased accordingly. In general, reaction mixtures containing from 1 to 2.5 stoichiometric equivalents of metal fluoride per C-halogen group of the aryl halide are preferred. Fluorides of any metal of groups I–A and II–A of the periodic table can be used, the preferred ones being lithium fluoride, sodium fluoride, potassium fluoride, calcium fluoride and barium fluoride. Sodium and calcium fluorides are particularly outstanding.

The reaction takes place relatively slowly at temperatures below about 250° C. It is therefore preferred to carry out the reaction at a temperature within the range of about 275° C. to 450° C., the optimum range being 350° C.–400° C. Good results are obtained when pressures within the range of about 100 to 1500 atmospheres are employed, the optimum pressure range being 200–650 atmospheres. As shown in Example II, the particular temperature/pressure combination will influence conversion of the aryl halide to aroyl fluoride to an important extent. The optimum conversion will normally be with a temperature/pressure combination within the preferred limits above although different combinations of temperature and pressure within those limits tend to give optimum conversions with different reactants.

Any convenient or suitable apparatus can be used. In batchwise operation pressure-resistant autoclaves made of or lined with relatively inert metals, such as stainless steel, silver, copper, and the like, can be employed advantageously. In continuous operation, tubular reaction vessels can be employed and, if desired, the reactants can be introduced at more than one point along the tubular reaction vessel. Similarly the nickel carbonyl, or a substance which produces nickel carbonyl under the reaction conditions, can be injected at one or more points along a tubular reaction vessel, if desired.

The reactants should be substantially anhydrous to avoid hydrolytic reactions which would decrease the yields. Any suitable method can be employed for separating the aroyl fluorides from the reaction mixture but normally a simple distillation is the preferred method. The unchanged aryl halide can, of course, be recycled. Part at least of the nickel present at the end of the reaction may be recovered as carbonyl or converted thereto, although the nickel fluoride which forms is not directly convertible to nickel carbonyl.

As already mentioned, aromatic acyl fluorides are valuable chemical intermediates which, in certain cases, have very important advantages over the corresponding acyl fluorides. The present invention provides a convenient, one-step process for preparing a wide variety of aromatic acyl fluorides from materials that are readily available and thus makes the preparation of these important aromatic acyl fluorides more practical.

As many apparently widely different embodiments of this invention may be made without departing from the spirit and scope thereof, it is to be understood that the invention is not limited to the specific embodiments thereof except as defined in the appended claims.

The invention claimed is:

1. Process of preparing benzoyl fluoride which comprises reacting under substantially anhydrous conditions at a temperature of 350° C.–400° C. and a pressure of 200 to 650 atmospheres monochlorobenzene in an atmosphere of carbon monoxide with 0.5 to 2.5 moles of preformed nickel carbonyl per equivalent of C-chlorine group of said monochlorobenzene and 1 to 2.5 stoichiometric equivalents, per C-chlorine group of said monochlorobenzene, of sodium fluoride.

2. Process of preparing benzoyl fluoride which comprises reacting under substantially anhydrous conditions at a temperature of 275° C.–450° C. and a pressure of 200 to 650 atmospheres an aromatic compound from the group consisting of monobromobenzene and monochlorobenzene, in an atmosphere of carbon monoxide with 0.5 to 2.5 moles of preformed nickel carbonyl per equivalent of C-halogen group of said aromatic compound and 1 to 2.5 stoichiometric equivalents, per C-halogen group of said aromatic compound, of sodium fluoride.

References Cited in the file of this patent

UNITED STATES PATENTS

| Number | Name | Date |
|---|---|---|
| 2,517,898 | Linville | Aug. 8, 1950 |
| 2,556,271 | Groombridge | June 12, 1951 |
| 2,565,461 | Bliss | Aug. 28, 1951 |
| 2,565,462 | Prichard et al. | Aug. 28, 1951 |
| 2,565,464 | Tabet | Aug. 28, 1951 |
| 2,570,793 | Gresham et al. | Oct. 9, 1951 |
| 2,580,070 | Brooks et al. | Dec. 5, 1951 |